(12) United States Patent
Julton et al.

(10) Patent No.: US 10,190,324 B2
(45) Date of Patent: Jan. 29, 2019

(54) MEMBRANE (71) Applicants: Svein Julton, Tinn Austbygde (NO); Joe Comitale, Mississauga (CA)

(72) Inventors: Svein Julton, Tinn Austbygde (NO); Joe Comitale, Mississauga (CA)

(*) Notice: Subject to any disclaimer, the term of this patent is extended or adjusted under 35 U.S.C. 154(b) by 0 days.

(21) Appl. No.: 15/589,385

(22) Filed: May 8, 2017

(65) Prior Publication Data

US 2017/0362841 A1    Dec. 21, 2017

Related U.S. Application Data (63) Continuation-in-part of application No. 29/591,162, filed on Jan. 17, 2017, and a continuation-in-part of application No. PCT/CA2015/051147, filed on Nov. 6, 2015.

(51) Int. Cl.
| | |
|---|---|
| *E04F 15/18* | (2006.01) |
| *E04F 15/22* | (2006.01) |
| *E04F 15/02* | (2006.01) |
| *F24D 13/02* | (2006.01) |

(52) U.S. Cl.
CPC ...... *E04F 15/225* (2013.01); *E04F 15/02044* (2013.01); *E04F 15/185* (2013.01); *E04F 15/186* (2013.01); *E04F 2290/023* (2013.01); *F24D 13/024* (2013.01)

(58) Field of Classification Search
CPC .. E04F 15/225; E04F 15/02044; E04F 15/186

USPC ............................. 52/302.1, 408, 413
See application file for complete search history.

(56) References Cited

U.S. PATENT DOCUMENTS

| | | | | |
|---|---|---|---|---|
| 2002/0139074 A1* | 10/2002 | Smith | ................ | E04F 15/02 52/302.1 |
| 2011/0185658 A1* | 8/2011 | Cerny | ................ | E04F 15/10 52/302.1 |
| 2011/0289875 A1* | 12/2011 | Lenoci | ................ | E04F 15/02 52/302.1 |
| 2013/0186026 A1* | 7/2013 | Curtin | ................ | F24F 13/068 52/302.1 |
| 2014/0013694 A1* | 1/2014 | Degiorgio | ................ | E04F 15/18 52/408 |
| 2015/0252563 A1* | 9/2015 | Cerny | ................ | E04B 5/43 52/588.1 |

* cited by examiner

*Primary Examiner* — Brent W Herring
(74) *Attorney, Agent, or Firm* — Sean O'Connell, PLLC (57) ABSTRACT

The membrane is for use with a planar surface and includes a generally planar member and a plurality of resilient tabs. The generally planar member, in use, is disposed in parallel relation to and adjacent the planar surface and, at least in use, defines a plurality of troughs, the troughs being interconnected to define a planar network of troughs that is disposed parallel to the surface, each trough presenting away from the surface in use and terminating in a common plane that is parallel to and spaced from the surface. The tabs are provided for each of one or more of the troughs, the tab lying in the common plane and spanning at least in part across said each trough.

3 Claims, 9 Drawing Sheets

MEMBRANE

CROSS-REFERENCE TO RELATED APPLICATION

This application is a continuation-in-part of U.S. Ser. No. 14/934,105, PCT/CA2015051147 and U.S. Ser. No. 29/591,162

FIELD OF THE INVENTION

The invention relates to the field of uncoupling membranes.

BACKGROUND OF THE INVENTION

It is well known to use an uncoupling membrane on a subfloor when installing tiles, to ensure that motion in the subfloor does not propagate to the tile.

SUMMARY OF THE INVENTION

Forming one aspect of the invention is a membrane for use with a planar surface. The membrane comprises a generally planar member and one or more resilient tabs. The member, in use, is disposed in parallel relation to and adjacent the planar surface and, at least in use, defines a plurality of troughs, the troughs being interconnected to define a planar network of troughs that is disposed parallel to the surface, each trough presenting away from the surface in use and terminating in a common plane that is parallel to and spaced from the surface. The resilient tabs are provided for each of one or more of the troughs, each tab lying in the common plane and spanning at least in part across said each trough.

According to another aspect of the invention, the member can define a plurality of protuberances separated one from another by the troughs.

According to another aspect of the invention, each protuberance can be tubular, can have a base surface that lies in the common plane, an end surface that is disposed parallel to and adjacent the planar surface and tubular walls that define the inner and outer walls of the tubular protuberance and extend between the base surface and the end surface.

According to another aspect of the invention, the plurality of protuberances can form rows and columns of protuberances, the rows being parallel to and equally spaced apart from one another, the columns being parallel to and equally spaced apart from one another and the rows being perpendicular to the columns.

According to another aspect of the invention, a pair of tabs can be provided for each protuberance, one of the pair being a first tab which projects in the direction of the rows, the other of the pair being a second tab which projects from the protuberance in the direction by which the rows are spaced apart.

According to another aspect of the invention, the first tabs can all project in a first direction parallel to the rows and the second tabs can all project in a second direction perpendicular to the rows.

According to another aspect of the invention, each protuberance can be cylindrical, the base surface of each protuberance can be circular and the end surface of each protuberance can be annular According to another aspect of the invention, the inner wall can have a diameter of 15 mm, the outer wall can have a diameter of 24 mm and the outer walls of adjacent protuberances can be 6 mm apart.

According to another aspect of the invention, the membrane can further comprise a mesh layer which is secured to the planar surface in use.

According to another aspect of the invention, the planar member can be defined by a sheet; and each protuberance can define a socket that presents towards the planar surface and is occluded by the mesh layer.

According to another aspect of the invention, each trough can have a concave surface that presents away from the surface.

Forming another aspect of the invention is membrane for use with a planar surface, the membrane comprising a base layer defining: [I] a notional network of lines that cross each other to form a series of rectangles; [II] centrally of each rectangle, a dome having a convex surface presenting away from the base layer; [III] a lip peripherally surrounding each dome and being defined by: an annular concave surface presenting away from the base layer and immediately surrounding the dome; a top surface peripherally surrounding the concave surface; and a tubular surface extending from the base layer to the top surface, the tubular surface having: (i) portions that are orientated generally parallel to the sides of the rectangle in which said each dome is situate and generally perpendicular to the base layer; and (ii) adjacent each corner of the rectangle in which said each dome is situate, a portion that is angled relative to the base layer, thereby to define overhanging corners of the ridge; [IV] at each intersection, a protuberance, the protuberances being disposed in spaced relation to one another and to the ridges and each having: a top surface generally aligned with the surfaces of the lips; a sidewall extending from the base layer to the top surface, the sidewall having, for each of the lips immediately adjacent to such protuberance, a concave portion presenting towards such lip; and four corners defined by the junctions of the concave portions of the sidewall; and [V] ridges defined in the base layer, each ridge connecting, in respect of a pair of adjacent protuberances, the immediately adjacent corners.

According to another aspect, the top surface of the lip can be generally planar and the top surface of the protuberance can be generally coplanar therewith.

According to another aspect: the top surface of the lip can slope downwardly to the concave surface; each protuberance can have a dome and a generally frustoconical surface surrounding the dome and extending upwardly and outwardly therefrom; and the top surface of the protuberance can slope downwardly towards the frustoconical surface.

DETAILED DESCRIPTION

Figure 9:
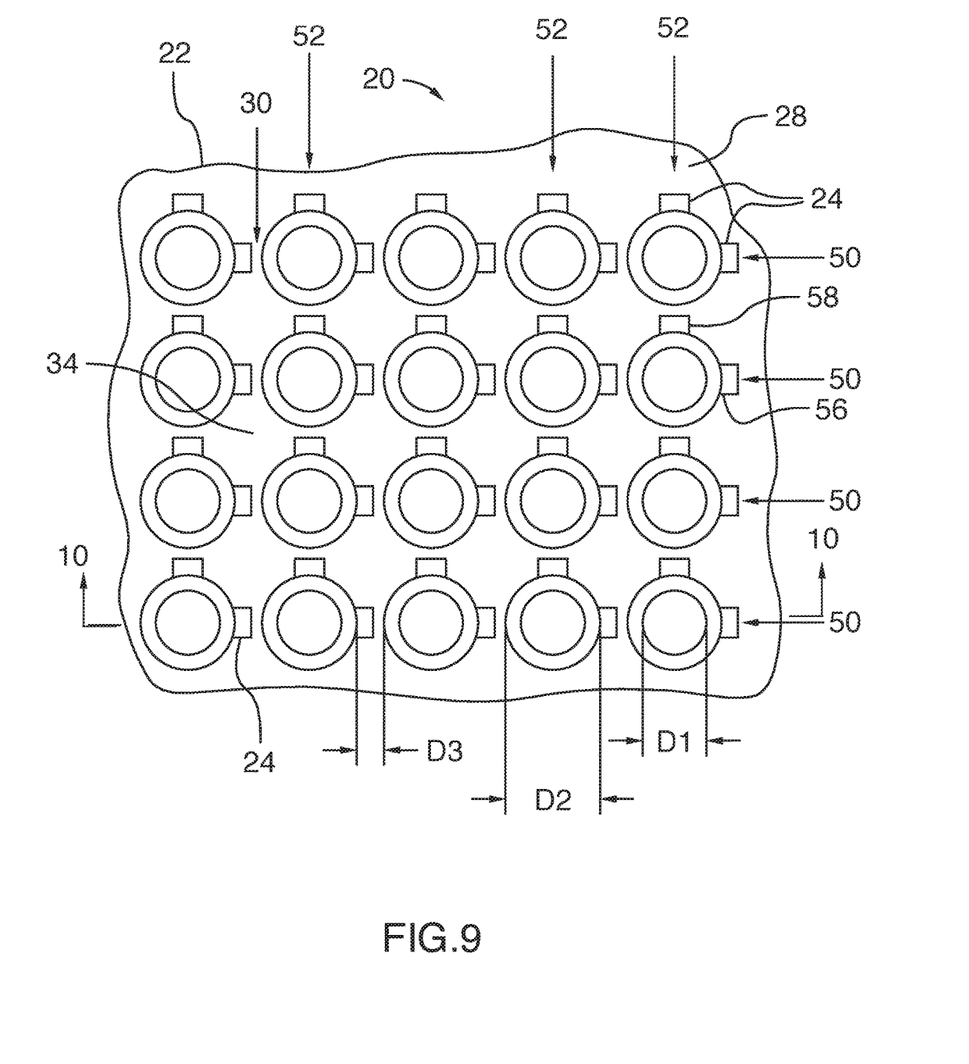
FIG. 9 is a plan view of a membrane according to a further exemplary embodiment of the invention.

A first exemplary embodiment of the invention, in the form of a membrane 20, is shown in FIG. 9

The membrane 20 comprises a generally planar member 22, resilient tabs 24 and a mesh layer 26.

The planar member 22 is defined by a sheet 28 and is formed, by vacuum forming or the like, to define a plurality of troughs 30 and a plurality of protuberances 32.

Each trough 30 is generally linear and has a concave interior surface 34.

Figure 10:
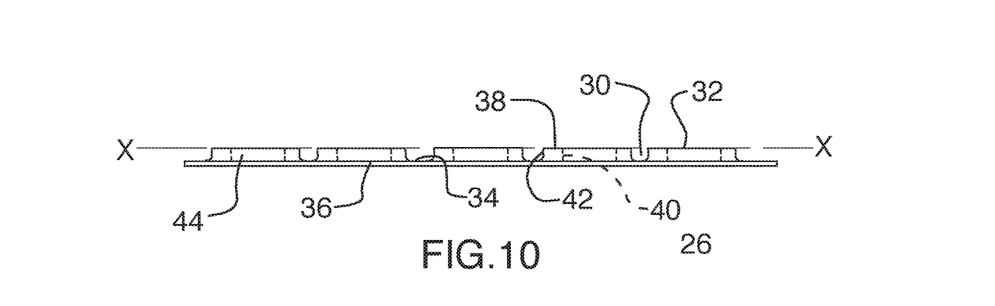
FIG. 10 is a view along 10-10 of FIG. 9.
Figure 11:
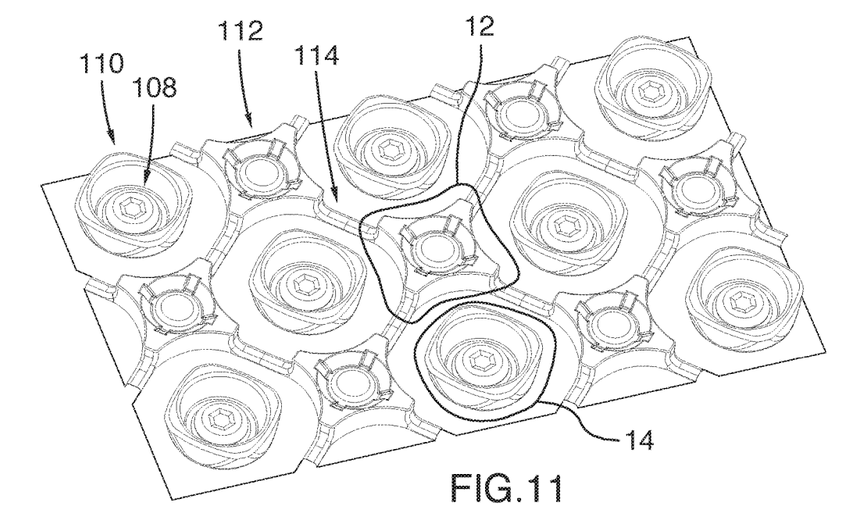
FIG. 11 is a perspective view of a membrane according to a further exemplary embodiment of the invention.
Figure 12:
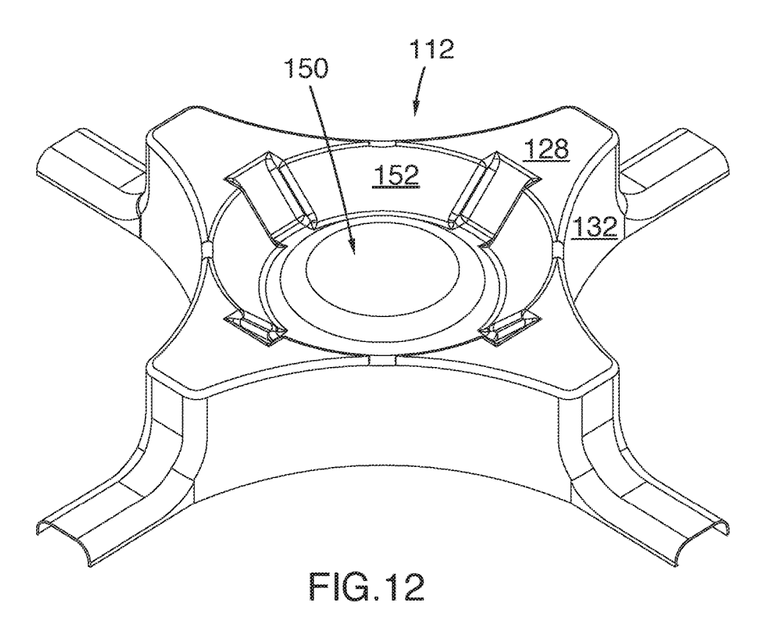
FIG. 12 is an enlarged view of the structure of encircled area 12 of FIG. 11
Figure 13:
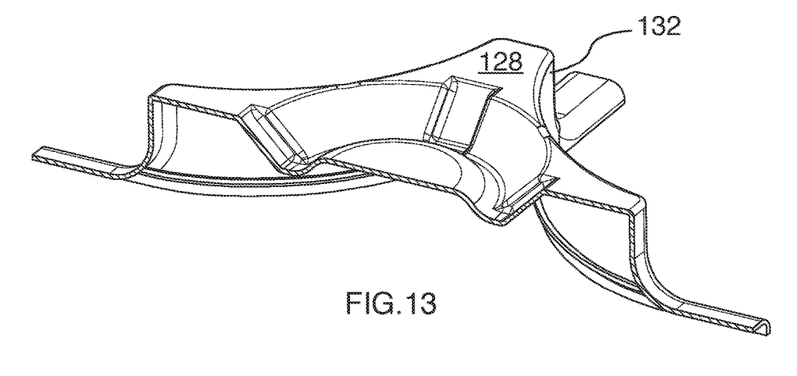
FIG. 13 is a cross-sectional view of a portion of the structure of FIG. 12.
Figure 14:
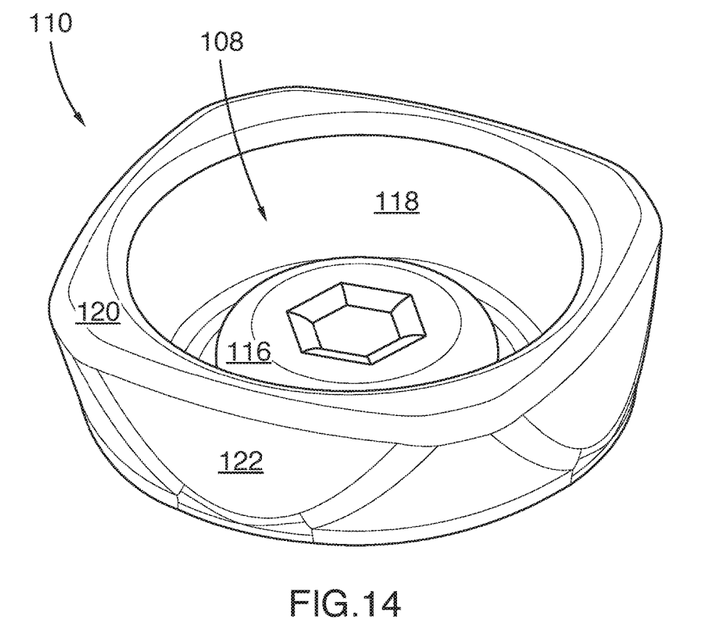
FIG. 14 is an enlarged view of the structure of encircled area 14 of FIG. 11.
Figure 15:
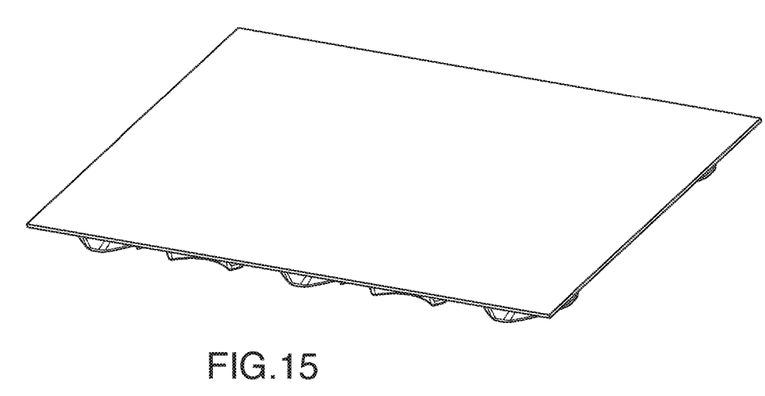
FIG. 15 is view of the underside of the structure of FIG. 11

Each protuberance 32:
is tubular, specifically cylindrical
has a circular base surface 36;
has an annular end surface 38;
has tubular walls 40, 42 that define the inner 40 and outer 42 walls of the tubular protuberance and extend between the base surface and the end surface; and
defines a socket 44

The inner wall 40 has a diameter D1 of 15 mm. The outer wall 42 has a diameter D2 of 24 mm.

The troughs 30 are interconnected to define a planar network of troughs 46, each trough terminating in a common plane X-X.

The protuberances 32 are separated one from another by the troughs 30 and form rows 50 and columns 52 of protuberances wherein:
the rows 50 are parallel to and equally spaced apart from one another;
the columns 52 are parallel to and equally spaced apart from one another;
the rows 50 are perpendicular to the columns 52;
the outer walls of adjacent protuberances are a distance D3 of 6 mm apart.

The plurality of tabs is provided such that a pair of tabs is provided for each protuberance: one 56 of the pair is a first tab which projects in a first direction, parallel to the rows; the other 58 of the pair is a second tab which projects from the protuberance in a second direction, perpendicular to the rows, i.e. in the direction by which the rows are spaced apart.

The mesh layer 26 is secured to the planar surface such that the sockets 44 are occluded by the mesh layer.

The membrane is for use with a planar surface, such as a subfloor.

In use (not shown), the membrane is positioned such that
the sockets 44 present in a common direction, towards the planar surface
the member 22 is disposed in parallel relation to and adjacent the planar surface
each trough 30 presents away from the surface
the common plane X-X is parallel to and spaced from the surface.

More particularly, in use (not shown):
a layer of mortar is laid upon the subfloor and the membrane is applied thereto such that the mortar grips the mesh;
heating cable is laid upon the membrane and forced beneath the tabs for securement; and
a layer of mortar is laid upon the membrane (and the heating cable) and used as a tile bed Persons of ordinary skill will readily appreciate that this structure provides the advantages of uncoupling membranes along with the advantages of heating cable securement membranes. By providing the resilient tabs, heating cables of varying diameters can be interfitted into the troughs, the diameter varying from a minimum diameter slightly larger than any gap between the tabs and the adjacent protuberances and a maximum slightly smaller than the width/depth of the trough.

A further exemplary embodiment of the invention in the form of a membrane 100 is shown in FIGS. 1-8

The membrane 100 comprises a sheet 102 and a mesh layer 104.

Figure 1:
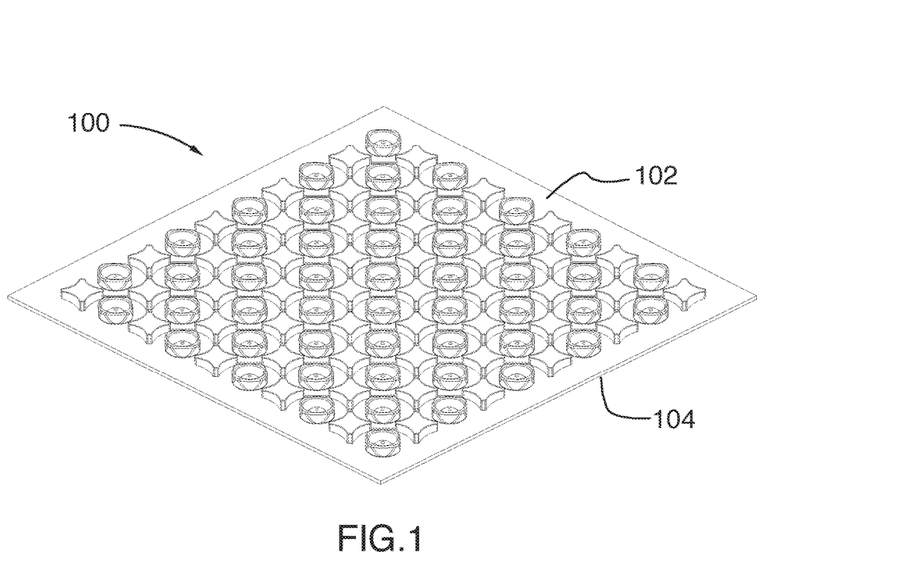
FIG. 1 is a perspective view of a membrane according to an exemplary embodiment of the invention.
Figure 2:
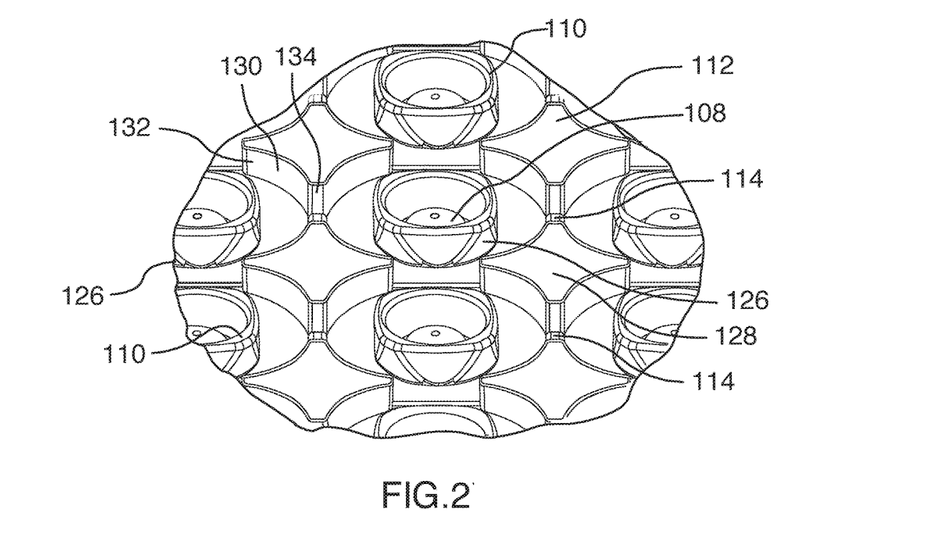
FIG. 2 is an enlarged view of encircled area 2 of FIG. 1.

The sheet 102 is formed, by vacuum forming or the like, to define a base layer 106, domes 108, lips 110, protuberances 112 and ridges 114.

Figure 3:
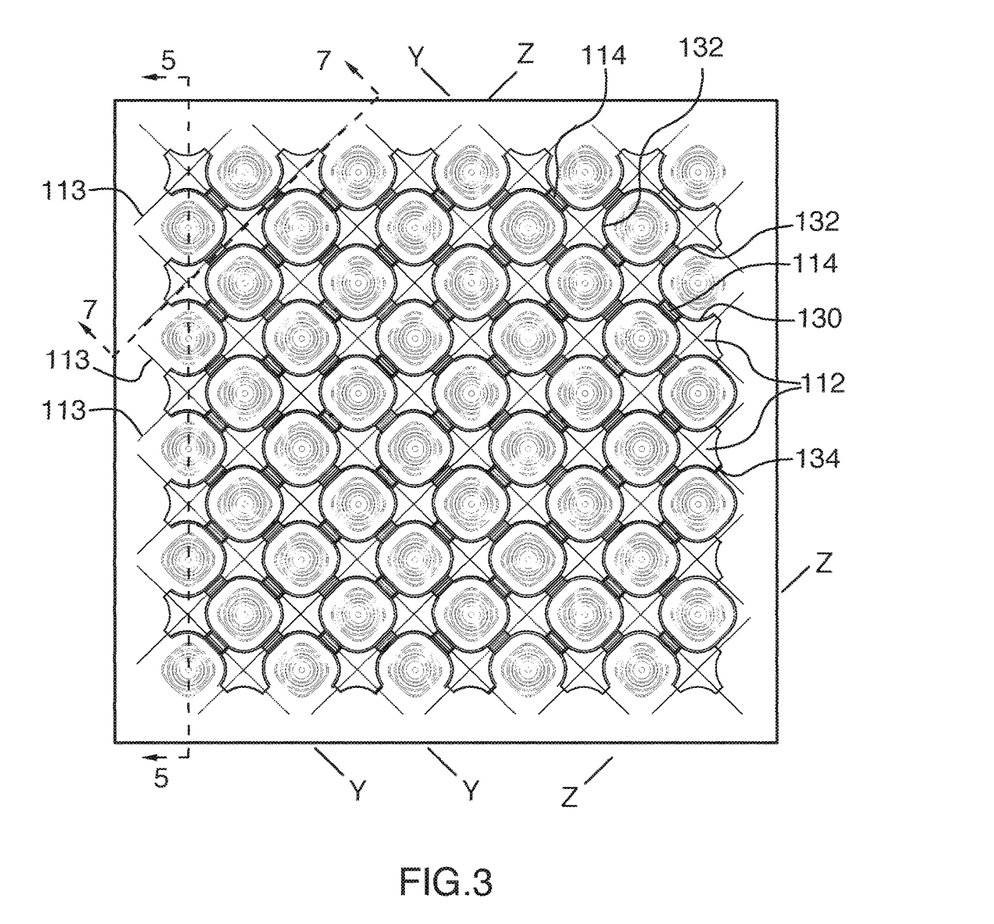
FIG. 3 is a plan view of the membrane of FIG. 1.
Figure 4:
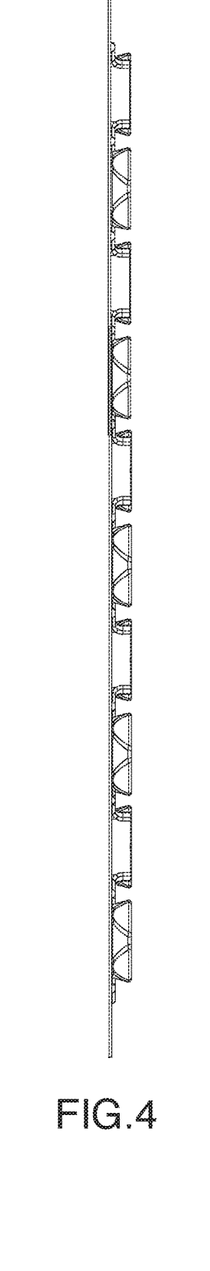
FIG. 4 is a side view of the membrane of FIG. 1.

The base layer 106 defines a notional network of lines Y-Y and Z-Z that cross each other to form a series of rectangles (not shown).

The domes 108 are defined one for each rectangle and centrally thereof, each dome 108 having a convex 116 surface presenting away from the base layer.

The lips 110 are defined such that a lip peripherally surrounds each dome and is defined by a concave surface 118, a top surface 120 and a tubular surface 122. The concave surface 118 is annular, presents away from the base layer 106 and immediately surrounds the dome 108. The top surface 120 is planar and peripherally surrounds the concave surface 118.

The tubular surface 122 extends from the base layer 106 to the planar surface 120 and has
portions that are orientated generally parallel to the sides of the rectangle in which said each dome is situate and generally perpendicular to the base layer adjacent each corner of the rectangle in which said each dome is situate, a portion 126 that is angled relative to the base layer, thereby to define overhanging corners of the lip The protuberances 112 are defined one for each intersection, are disposed in spaced relation to one another and to the ridges and each has: a top surface 128 coplanar with the surfaces of the lips; a sidewall 130 extending from the base layer to the top surface, the sidewall having, for each of the lips immediately adjacent to such protuberance, a concave portion 132 presenting towards such lip; and four corners 134 defined by the junctions of the concave portions of the sidewall.

The ridges 106 are defined in the base layer such that each ridge connects, in respect of a pair of adjacent protuberances, the immediately adjacent corners.

Figures 5, 6:
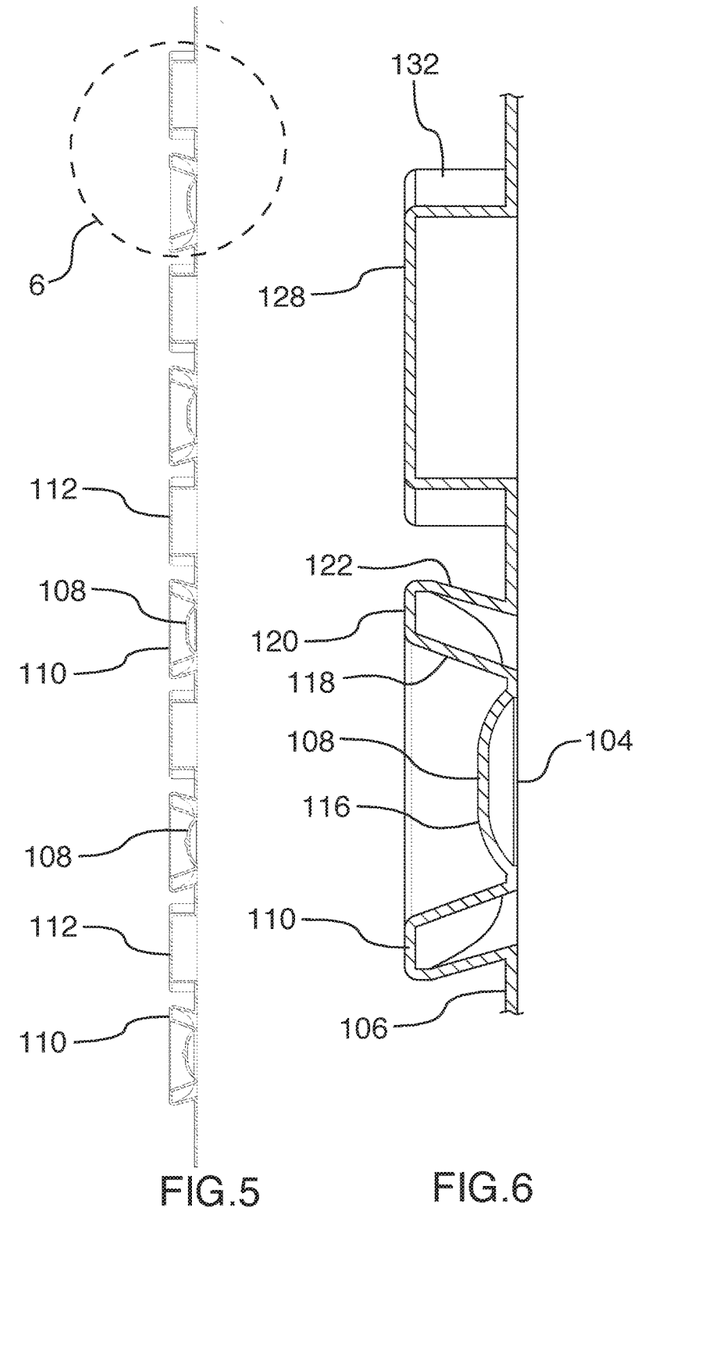
FIG. 5 is a view along section 5-5 of FIG. 3.
FIG. 6 is a view of encircled area 6 of FIG. 5.
Figure 7:
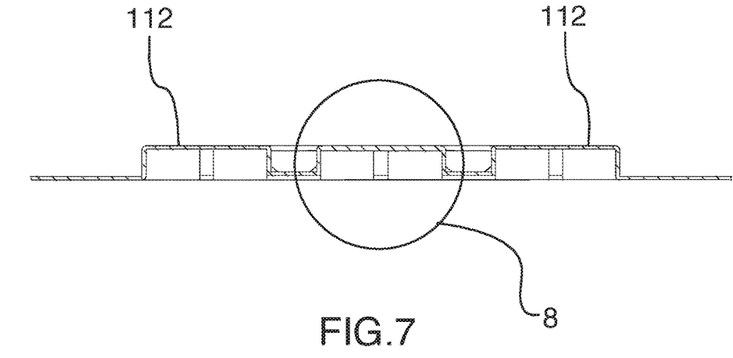
FIG. 7 is a view along section 7-7 of FIG. 3.
Figure 8:
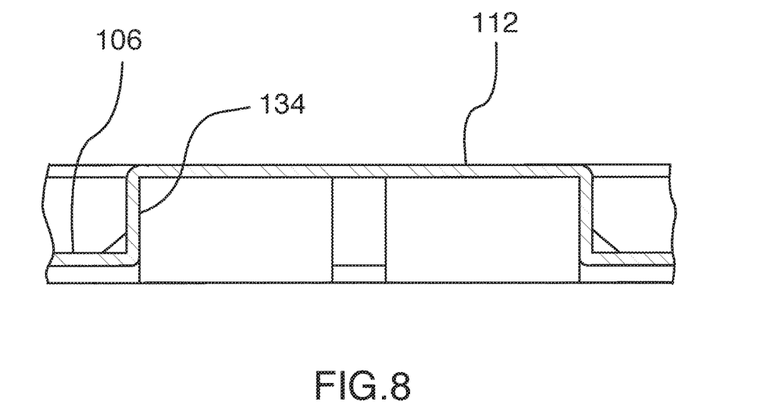
FIG. 8 is a view of encircled area 8 of FIG. 7.

The mesh layer 104 is secured to and in coplanar relation with the base surface.

The membrane is for use with a planar surface, such as a subfloor.

In use (not shown):
a layer of mortar is laid upon the subfloor and the membrane is applied thereto such that the mortar grips the mesh;
heating cable is laid upon the membrane and forced beneath the corners of the lips for securement; and a layer of mortar is laid upon the membrane (and the heating cable) and used as a tile bed Persons of ordinary skill will readily appreciate that the invention provides the advantages of uncoupling membranes along with the advantages of heating cable securement membranes. By providing the overhanging corners, heating cables of varying diameters can be interfitted into the troughs.

Yet another variation of the membrane is shown in FIGS. 11-15. This membrane is generally similar to membrane of FIGS. 1-8 and, to the extent of such similarity, is provided with commensurate reference numerals, but differs notably in that each protuberance has a dome 150 and a generally frustoconical surface 152 surrounding the dome and extending upwardly and outwardly therefrom to the top surface.

Figure 16:
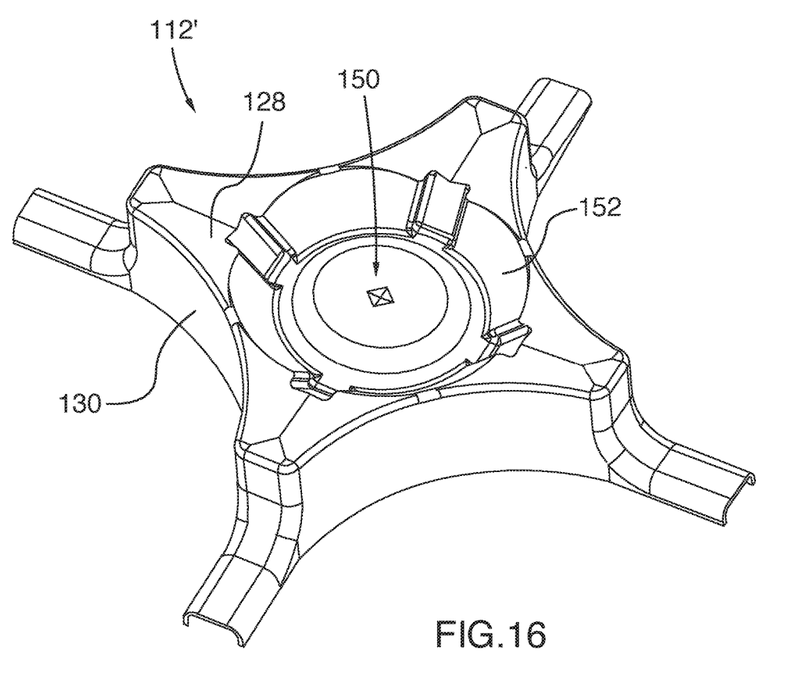
FIG. 16 is a view, similar to FIG. 12, of yet another embodiment.
Figure 17:
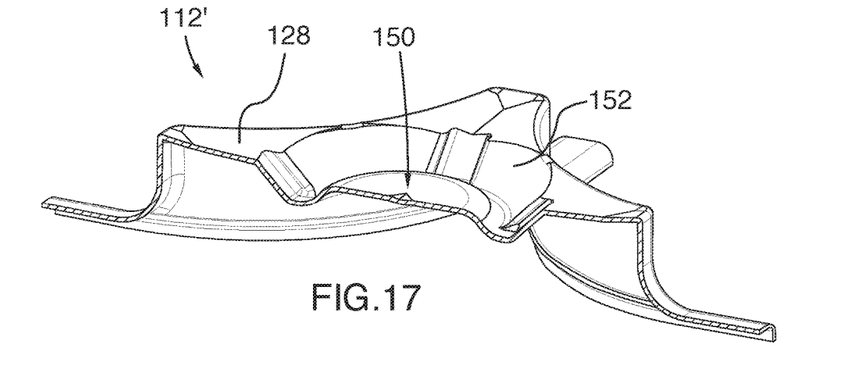
FIG. 17 is a view, similar to FIG. 13, of the structure of FIG. 16.
Figure 18:
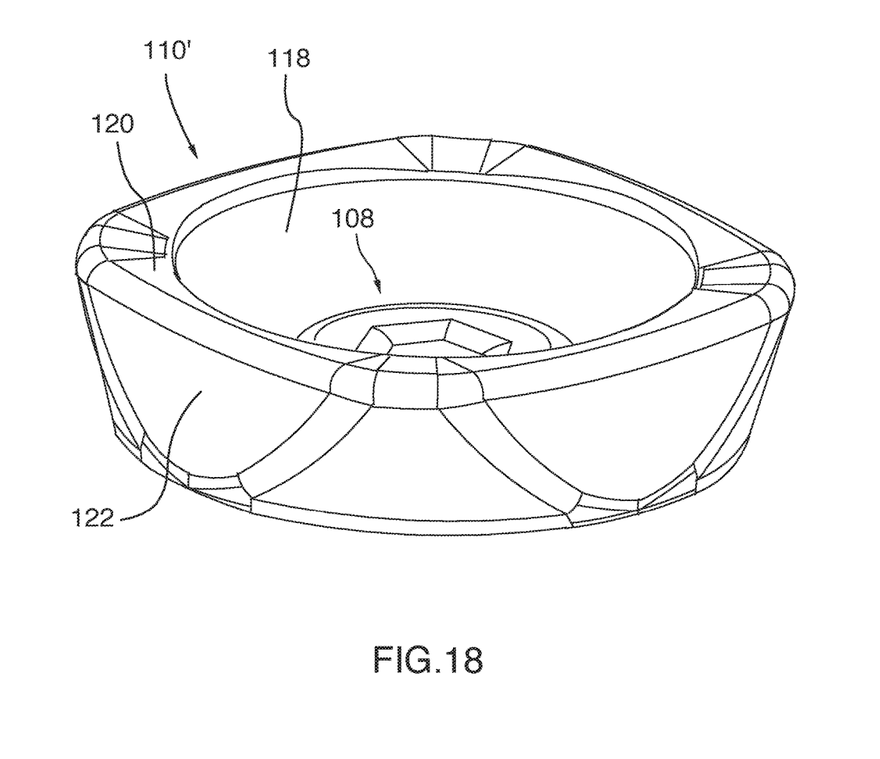
FIG. 18 is a view, similar to FIG. 14, of yet another embodiment.

Further variations are shown in FIGS. 16-18, which show a modified lip 110' and a modified protuberance 112' wherein the top surface 120' of the lip slopes downwardly to the concave surface 118 and the top surface 128' of the protuberance slopes downwardly towards the frustoconical surface 152.

Whereas specific embodiments are herein shown and described, further variations are possible.

For example, whereas each trough 30 is indicated to be generally linear and have a concave interior surface, it will be appreciated that the troughs could be fully linear (by, for example, providing square protuberances) and could have a flat bottom and perpendicular sides.

As well, whereas gaps are shown between the tabs and the adjacent protuberance, this is not necessary; the tabs could extend fully to the adjacent protuberance.

Further, pairs of tabs could be provided, which extend to one another from adjacent protuberances, to provide for the capture of the heating wire, in contrast to the single tab capture mechanism illustrated.

Accordingly, the invention should be understood to be limited only by the accompanying claims, purposively construed.

The invention claimed is:

1. A membrane for use with a planar surface, the membrane comprising a base layer defining:

a notional network of lines that cross each other to form a series of rectangles;

centrally of each rectangle, a dome having a convex surface presenting away from the base layer;

a lip peripherally surrounding each dome and being defined by: an annular concave surface presenting away from the base layer and immediately surrounding the dome; a top surface peripherally surrounding the concave surface; and a tubular surface extending from the base layer to the top surface, the tubular surface having: (i) portions that are orientated generally parallel to the sides of the rectangle in which said each dome is situated and generally perpendicular to the base layer; and (ii) adjacent each corner of the rectangle in which said each dome is situated, a portion that is angled relative to the base layer, thereby to define overhanging corners of a ridge a plurality of protuberances, the protuberances being disposed in spaced relation to one another and to the ridges and each having: a top surface generally aligned with the surfaces of the lips; a sidewall extending from the base layer to the top surface, the sidewall having, for each of the lips immediately adjacent to such protuberance, a concave portion presenting towards such lip; and four corners defined by the junctions of the concave portions of the sidewall; and wherein each ridge is defined in the base layer, each ridge connecting, in respect of a pair of adjacent protuberances, the immediately adjacent corners.

2. A membrane according to claim 1, wherein:

the top surface of the lip is generally planar; and the top surface of the protuberance is generally planar to the top surface of the lip.

3. A membrane according to claim 2, wherein:

the top surface of the lip slopes downwardly to the concave surface;

each protuberance has a dome and a generally frustoconical surface surrounding the dome and extending upwardly and outwardly therefrom; and the top surface of the protuberance slopes downwardly towards the frustoconical surface.

* * * * *